United States Patent
Yoon (10) Patent No.: US 12,172,363 B2
(45) Date of Patent: Dec. 24, 2024

(54) APPARATUS AND METHOD FOR MANUFACTURING INTERIOR MATERIAL FOR VEHICLE

(71) Applicant: SEOYON E-HWA CO., LTD., Anyang (KR)

(72) Inventor: Chi Won Yoon, Anyang (KR)

(73) Assignee: SEOYON E-HWA CO., LTD., Anyang (KR)

( * ) Notice: Subject to any disclaimer, the term of this patent is extended or adjusted under 35 U.S.C. 154(b) by 172 days.

(21) Appl. No.: 18/049,254

(22) Filed: Oct. 24, 2022

(65) Prior Publication Data
US 2023/0131654 A1    Apr. 27, 2023

(30) Foreign Application Priority Data

Oct. 27, 2021   (KR) .......................... 10-2021-0144951

(51) Int. Cl.
| | | |
|---|---|---|
| B29C 63/02 | (2006.01) | |
| B29C 63/00 | (2006.01) | |
| B29L 31/30 | (2006.01) | |

(52) U.S. Cl.
CPC ........ B29C 63/025 (2013.01); B29C 63/0047 (2013.01); B29C 63/0073 (2013.01); *B29C 2063/0008* (2013.01); *B29L 2031/3005* (2013.01)

(58) Field of Classification Search
CPC ............... Y10T 156/1028; B29C 51/10; B29L 2031/3008; B29L 2031/3041
See application file for complete search history.

(56) References Cited

U.S. PATENT DOCUMENTS

| | | | |
|---|---|---|---|
| 6,508,289 B2 * | 1/2003 | Hagai | B29C 43/184 |
| | | | 156/580 |
| 7,997,894 B2 * | 8/2011 | Schilles | B29C 43/203 |
| | | | 425/510 |
| 9,302,422 B2 | 4/2016 | Meyer | |
| 2008/0280453 A1 | 11/2008 | Dutouquet | |

(Continued)

FOREIGN PATENT DOCUMENTS

| | | |
|---|---|---|
| DE | 9408396 U1 | 7/1994 |
| DE | 10153035 A1 | 5/2003 |

(Continued)

OTHER PUBLICATIONS

CN OA dated Mar. 22, 2024.
IN OA dated Jan. 31, 2024.
DE OA mailed May 13, 2024.

*Primary Examiner* — Carson Gross
(74) *Attorney, Agent, or Firm* — Harvest IP Law, LLP (57) ABSTRACT

Proposed are an apparatus and a method for manufacturing an interior material for a vehicle, in which a core and a skin can be integrated by a pressing operation. The apparatus includes a first mold unit having a first molding surface, and a second mold unit having a second molding surface corresponding to the first molding surface. The core is mounted on the second molding surface. The first mold unit includes a first fixing part, and the second mold unit includes a second fixing part. The first fixing part and the second fixing part are configured to fix an outer peripheral portion of a skin placed between the first mold unit and the second mold unit.

13 Claims, 8 Drawing Sheets

(56) References Cited

U.S. PATENT DOCUMENTS

2008/0284053 A1\* 11/2008 Dutouquet .............. B29C 51/12
　　　　　　　　　　　　　　　　　　　　　　　264/102
2016/0361837 A1　12/2016　Hayes
2018/0345549 A1　12/2018　Park

FOREIGN PATENT DOCUMENTS

| DE | 102008001742 A1 | 11/2008 | | |
|---|---|---|---|---|
| DE | 10-2008-009762 A | 8/2009 | | |
| JP | 1995-101030 A | 4/1995 | | |
| JP | 2001-293737 A | 10/2001 | | |
| JP | 2006110984 A | \* | 4/2006 | ......... B29C 44/1257 |
| JP | 2011104962 A | \* | 6/2011 | |
| KR | 10-1445144 B1 | 9/2014 | | |

\* cited by examiner

APPARATUS AND METHOD FOR MANUFACTURING INTERIOR MATERIAL FOR VEHICLE

CROSS REFERENCE TO RELATED APPLICATION

The present application claims priority to Korean Patent Application No. 10-2021-0144951, filed Oct. 27, 2021, the entire contents of which is incorporated herein for all purposes by this reference.

BACKGROUND OF THE INVENTION

Field of the Invention

The present disclosure relates to an apparatus and a method for manufacturing an interior material for a vehicle that are capable of pressing a core and a skin after placing the core and the skin inside a mold.

Description of the Related Art

To meet with the growing requirement of applying premium interior materials to vehicles, in-mold graining (IMG) has been introduced and used for manufacturing automobile interior materials. IMG molding enables surface treatment of interior materials by using a mold with a sophisticated pattern or texture realized through electroforming, thereby creating premium automotive interior materials.

In general, real stitches are used for premium vehicle interior. Recently, interior materials with stitch types other than real stitches have emerged.

A conventional manufacturing process for an interior material having real stitches is performed in the order of: (1) preforming skin with an IMG mold, (2) sewing real stitches on the preformed skin, (3) temporary adhering the skin and a core, (4) pressing the temporarily adhered skin and core with a pressing mold.

However, positional deviation occurring between the mold and the skin during pressing operation of the skin and the core causes wrinkles in the skin when pressing operation of the skin and the core is completed.

In addition, since the skin and the core are pressed together after the temporary adhering of the skin and the core, equipment for temporary adhering operation and equipment for pressing operation are required. This results in an increased manufacturing cost.

According to the related art, the mold is composed of an upper mold and a lower mold, and the core or skin is mounted on a lower surface of the upper mold. Therefore, in order to mount the core or skin on the lower surface of the upper mold, the upper mold needs to be lifted to a predetermined height and then be tilted at a predetermined angle. As described above, as the process of tilting the upper mold at a predetermined angle is additionally required, the process of manufacturing the vehicle interior material becomes complicated and the time required to manufacture the vehicle interior material is increased.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide an apparatus and a method for manufacturing an interior material for a vehicle that are capable of pressing a core and a skin after placing the core and the skin inside a mold without tilting the mold at a predetermined angle.

Another objective of the present disclosure is to provide an apparatus and a method for manufacturing an interior material for a vehicle that are capable of preventing wrinkles from occurring in a skin when a core and the skin are pressed together.

In order to achieve the above objective, according to one aspect of the present disclosure, there is provided an apparatus for manufacturing an interior material for a vehicle, the apparatus including: a first mold unit having a first molding surface; and a second mold unit located below the first mold unit, having a second molding surface corresponding to the first molding surface, and configured to mount a core on the second molding surface, wherein the first molding surface and the second molding surface may press the mounted core and a central portion of a skin placed above the mounted core when brought closer to each other, the first mold unit may include a first fixing part, the second mold unit may include a second fixing part, and the first fixing part and the second fixing part may clamp the skin by pressing an outer peripheral portion of the skin placed between the first mold unit and the second mold unit.

The apparatus may further include: a first support part including a first elastic member configured to apply a first elastic force to the first fixing part; and a second support part including a second elastic member configured to apply a second elastic force to the second fixing part.

The second elastic member may have a smaller elastic modulus than the first elastic member.

The first elastic member may include a plurality of first elastic members, and the plurality of first elastic members may be connected to each other through a first support member to simultaneously apply the first elastic force to the first fixing part.

The second elastic member may include a plurality of second elastic members, and the plurality of second elastic members may be connected to each other through a second support member to simultaneously apply the second elastic force to the second fixing part.

The first fixing part may include a first fixing member disposed to face the second mold unit and configured to support the skin by contacting an upper surface of the outer peripheral portion of the skin, and the second fixing part may include a second fixing member disposed to face the first fixing member and configured to support a lower surface of the outer peripheral portion of the skin.

The first fixing member may include a plurality of first fixing members, and the plurality of first fixing members may be connected to a first connection member through a plurality of first rods to simultaneously clamp the skin.

The second fixing member may include a plurality of second fixing members, and the plurality of second fixing members may be connected to a second connection member through a plurality of second rods to simultaneously clamp the skin.

The apparatus may further include an air control unit configured to inject gas into a space between the core and the skin. Alternatively, the apparatus may further include an air control unit configured to discharge gas from the space between the core and the skin.

According to another aspect of the present disclosure, there is provided a method of manufacturing an interior material for a vehicle by using an apparatus including: a first mold unit having a first molding surface; and a second mold unit located below the first mold unit, having a second molding surface corresponding to the first molding surface, and configured to mount a core on the second molding surface, wherein the first molding surface and the second molding surface may press the mounted core against a central portion of a skin placed above the mounted core when brought closer to each other, the first mold unit may include a first fixing part, the second mold unit may include a second fixing part, and the first fixing part and the second fixing part may clamp the skin by pressing an outer peripheral portion of the skin placed between the first mold unit and the second mold unit, the method including the steps of: (a) mounting the core on the second molding surface; (b) seating the skin on a second fixing member; (c) clamping the seated skin by a first fixing member and the second fixing member by moving the first fixing member toward the second fixing member; and (d) pressing the mounted core and the clamped skin by the first molding surface and the second molding surface by bringing the first molding surface and the second molding surface closer to each other.

The method may further include the step of injecting air into a space between the core and the skin between step (c) and step (d).

The method may further include the step of bringing the core and the skin into close contact with each other while the first molding surface is not in contact with the skin between step (c) and step (d).

The method may further include the step of discharging air from the space between the core and the skin after step (d).

According to the embodiment of the present disclosure, it is possible to press the core and the skin after placing the core and the skin inside the mold without tilting the mold at a predetermined angle. This can simplify a manufacturing process of the interior material for the vehicle, and shorten a manufacturing time for the interior material for the vehicle.

Furthermore, according to the embodiment of the present disclosure, when the core and the skin are pressed together, it is possible to prevent wrinkles from occurring in the skin. This can improve surface quality of the skin, and lower manufacturing cost by reducing defect rate.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, exemplary embodiments of the present disclosure will be described in detail with reference to the accompanying drawings.

An apparatus and a method according to embodiments of the present disclosure may perform a pressing operation for manufacturing an interior material for a vehicle. The interior material includes a core (refer to reference numeral C in FIG. 3) and a skin (refer to reference numeral S in FIG. 3) adhered to each other by the pressing operation.

The interior material for the vehicle may be used, for example, for an armrest, console box, crash pad, dashboard, door panel, door trim, glove box, headliner, and headrest.

The interior material for the vehicle manufactured according to an embodiment of the present disclosure may have a structure in which a core and a skin are adhered to each other with an adhesive. In the embodiment of the present disclosure, the pressing operation may be performed in a state in which the adhesive is applied to at least one of the core and the skin.

The skin used for manufacturing the interior material for the vehicle according to the embodiment of the present disclosure may be a soft skin composed of a skin layer and a foam layer, and may have real stitches. The foam layer may be interposed between the core and the skin layer. The real stitches may be formed by a sewing process using a sewing machine or the like. The real stitches may be formed on an outer peripheral portion of the skin. The skin used for manufacturing the interior material for the vehicle according to the embodiment of the present disclosure may be formed in a size having a central portion adhered to the core and an outer peripheral portion surrounding the central portion.

The material of the skin layer may include polyvinyl chloride (PVC), or olefin-based thermoplastic elastomer (TPO) and thermoplastic polyurethane (TPU), which are a kind of thermoplastic elastomer (TPE). The material of the foam layer may include polypropylene foam, polyurethane foam, ethylene vinyl acetate foam, etc. However, the embodiment of the present disclosure is not limited thereto.

The core may be a hard injection-molded synthetic resin. The material of the core may include acrylonitrile butadiene styrene, acrylonitrile styrene, polyamide, polycarbonate, polyethylene, polyphenylene sulfide, polypropylene, polystyrene, PVC, etc. However, the embodiment of the present disclosure is not limited thereto. The core used for manufacturing the interior material for the vehicle according to the embodiment of the present disclosure may be configured to have a porous structure. Therefore, the core may have channels that are passages through which gas such as air passes. The passages (channels) may be partially distributed in the core or may be distributed throughout the core. For example, the core may have a porous structure by processing fine channels as passages through which gas passes. As another example, the core may have a porous structure by being manufactured to include pores through which gas passes. Of course, the pores may be connected to each other to form passages through which gas passes.

Referring to FIGS. 1 to 7, an apparatus according to an embodiment of the present disclosure includes a first mold unit 10, a second mold unit 20, and an air control unit 30. The first mold unit 10 and the second mold unit 20 are provided to face each other in a vertical direction.

Figure 1:
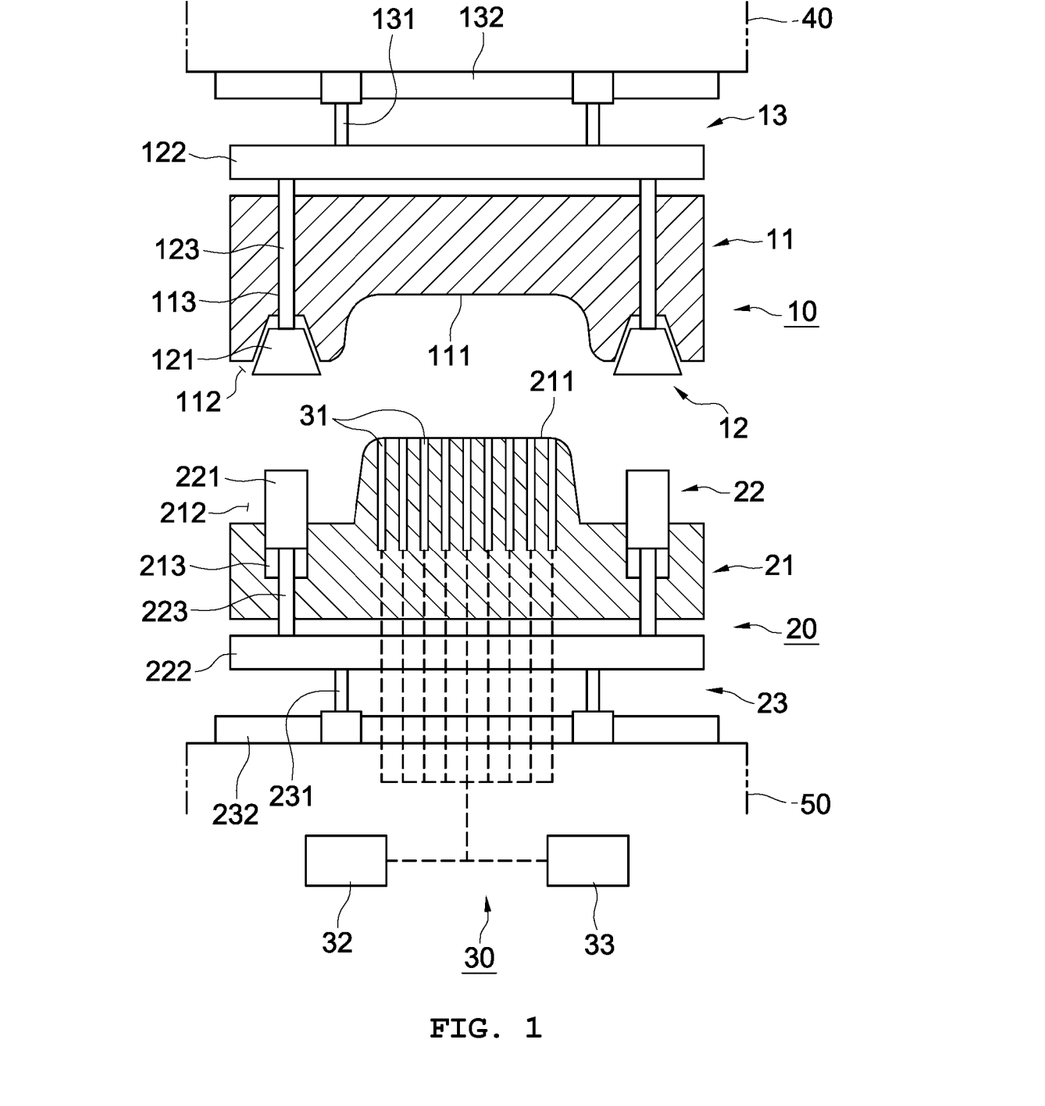
FIG. 1 is a view schematically illustrating an apparatus for manufacturing an interior material for a vehicle according to an embodiment of the present disclosure.

The first mold unit 10 is located above the second mold unit 20. The first mold unit 10 is connected to a lifting unit 40. The lifting unit 40 may be disposed above the first mold unit 10. By the lifting unit 40, the first mold unit 10 may be lifted to be spaced apart from the second mold unit 20 and may be lowered to be closer to the second mold unit 20.

The second mold unit 20 is mounted on a base 50. The second mold unit 20 is fixed in position. That is, the second mold unit 20 may be maintained in a stationary state while the first mold unit 10 is lifted and lowered.

Alternatively, the apparatus according to the embodiment of the present disclosure may be configured such that the second mold unit 20 is lifted and lowered with respect to the first mold unit 10 while the first mold unit 10 is maintained in a stationary state. Alternatively, the first mold unit 10 and the second mold unit 20 may be configured to be spaced apart or brought closer.

The first mold unit 10 includes a first molding part 11, a first fixing part 12, and a first support part 13.

The first molding part 11 may be configured in a block shape. The first molding part 11 has a first molding region composed of a first molding surface 111 facing the second mold unit 20, and a first clamping region 112 surrounding the first molding surface 111. The first molding surface 111 may be brought into contact with the skin S and press the skin S during pressing of the core C and the skin S, and may be formed to mold the skin S into a predetermined shape.

The first fixing part 12 may press an upper surface of the outer peripheral portion of the skin S from above in order to clamp the skin S.

The first fixing part 12 includes a first fixing member 121, a first connection member 122, and a first rod 123.

The first fixing member 121 is disposed to face the second mold unit 20. The first fixing member 121 is brought into contact with the upper surface of the outer peripheral portion of the skin S in order to press the outer peripheral portion of the skin S. The first fixing member 121 may be positioned in the first clamping region 112, and be formed in a closed ring shape corresponding to the outer peripheral portion of the skin S.

When the first molding part 11 is lowered, the first fixing member 121 may be lowered together.

The closed ring-shaped first fixing member 121 is composed of a plurality of units divided along the closed ring shape. The plurality of units of the first fixing member 121 are continuously arranged in a line along the closed ring shape, and are formed to be in close contact with each other. The plurality of units of the first fixing member 121 are connected to each other by the first connection member 122. Therefore, the units of the first fixing member 121 may be moved substantially simultaneously, may be brought into contact with the upper surface of the outer peripheral portion of the skin S substantially simultaneously, and may uniformly press the upper surface of the outer peripheral portion of the skin S.

A plurality of first rods 123 are provided. The plurality of first rods 123 connect the plurality of units of the first fixing member 121 to the first connection member 122. The first connection member 122 is disposed above the first molding part 11. The plurality of first rods 123 vertically pass through the first molding part 11, with respective lower ends thereof being respectively connected to the plurality of units of the first fixing member 121, and respective upper ends thereof being connected to the first connection member 122.

The first mold unit 10 is configured such that each of the plurality of first rods 123 passes through the first molding part 11 through a guide hole 113 of the first molding part 11 and is movable in the vertical direction. Thus, the first fixing part 12 may be lifted and lowered independently of the first molding part 11.

The first support part 13 includes a first elastic member 131 and a first support member 132. The first support part 13 is disposed above the first connection member 122.

The first elastic member 131 is connected to the first connection member 122. The first elastic member 131 applies a first elastic force to the first fixing member 121 through the first connection member 122 and the first rods 123. The first elastic member 131 may be compressed in the vertical direction and restored to its original shape. When the first fixing member 121 presses the upper surface of the outer peripheral portion of the skin S, the first elastic force of the first elastic member 131 allows the upper surface of the outer peripheral portion of the skin S to be elastically pressed.

A plurality of first elastic members 131 are provided. The plurality of first elastic members 131 may be uniformly arranged with respect to the first connection member 122. The plurality of first elastic members 131 are connected to each other by the first support member 132. The first support member 132 is connected to the lifting unit 40. Therefore, the plurality of first elastic members 131 may substantially simultaneously provide the first elastic force to the first fixing member 121 through the first connection member 122.

The second mold unit 20 includes a second molding part 21, a second fixing part 22, and a second support part 23.

The second molding part 21 may be configured in a block shape. The second molding part 21 has a second molding region composed of a second molding surface 211 facing the first molding surface 111, and a second clamping region 212 surrounding the second molding surface 211. In order to press the core C and the skin S, the core C having a porous structure is mounted on the second molding surface 211. The second molding surface 211 may press the mounted skin S during pressing of the core C and the skin S.

The first molding surface 111 and the second molding surface 211 correspond to each other. The core C and the skin S are interposed between the first molding surface 111 and the second molding surface 211 and pressed together by the first molding surface 111 and the second molding surface 211. Therefore, an interior material for a vehicle is provided, the interior material having a shape conforming to a space defined between the first molding surface 111 and the second molding surface 211.

The second fixing part 22 may press a lower surface of the outer peripheral portion of the skin S from below upwards against the first fixing part 12 in order to clamp the skin S with the first fixing part 12.

The second fixing part 22 includes a second fixing member 221, a second connection member 222, and a second rod 223.

The second fixing member 221 is positioned in the second clamping region 212, and is formed in a closed ring shape corresponding to the outer peripheral portion of the skin S. The second fixing member 221 has a shape conforming to the first fixing member 121 and is disposed to face the first fixing member 121. The skin S is seated on the closed ring-shaped second fixing member 221, and the second fixing member 221 supports the skin S by contacting the lower surface of the outer peripheral portion of the skin S.

Here, the second fixing member 221 may be disposed to maintain the skin S in a state spaced apart from the first molding surface 111 and the second molding surface 211 by a predetermined distance.

For example, the skin S may be seated on the second fixing member 221 by its own weight. As another example, the second fixing member 221 may have an adsorption hole in an upper portion thereof, and the skin S may be adsorbed on the second fixing member 221 by an air suction action through the adsorption hole. As another example, an adhesive member or a pressure-sensitive adhesive member may be provided on the second fixing member 221, and the skin S may be maintained seated position on the second fixing member 221 by the adhesive member or the pressure-sensitive adhesive member.

When the first mold unit 10 is lowered by the lifting unit 40, the first fixing member 121 is lowered together. In a state in which the core C is mounted on the second molding surface 211 and the skin S is seated on the second fixing member 221, the lowered first fixing member 121 presses the upper surface of the outer peripheral portion of the skin S. At this time, the second fixing member 221 presses the lower surface of the outer peripheral portion of the skin S by using a reaction force against a pressing force of the first fixing member 121. Therefore, the first fixing member 121 and the second fixing member 221 may clamp the skin S by pressing the outer peripheral portion of the skin S together.

Meanwhile, in a state in which the first fixing member 121 and the second fixing member 221 clamp the skin S together, the skin S may be maintained spaced apart from the first molding surface 111 and the second molding surface 211 by a predetermined distance.

The closed ring-shaped second fixing member 221 is composed of a plurality of units divided along the closed ring shape. The plurality of units of the second fixing member 221 are continuously arranged in a line along the closed ring shape, and are formed to be in close contact with each other. The plurality of units of the second fixing member 221 are connected to each other by the second connection member 222. Therefore, the plurality of units of the second fixing member 221 may be moved substantially simultaneously, may uniformly support the outer peripheral portion of the skin S, and may uniformly press the lower surface of the outer peripheral portion of the skin S.

A plurality of second rods 223 are provided. The plurality of second rods 223 connect the plurality of units of the second fixing member 221 to the second connection member 222, respectively. The second connection member 222 is disposed below the second molding part 21. The plurality of second rods 223 vertically pass through the second molding part 21, with respective upper ends thereof being respectively connected to the plurality of units of the second fixing member 221, and respective lower ends thereof being connected to the second connection member The second mold unit 20 is configured such that each of the plurality of second rods 223 passes through the second molding part 21 through a guide hole 213 of the second molding part 21 and is movable in the vertical direction. Thus, the second fixing part 22 may be lifted and lowered while the second molding part 21 is maintained in a stationary state.

The second support part 23 includes a second elastic member 231 and a second support member 232. The second support part 23 is disposed below the second connection member 222.

The second elastic member 231 is connected to the second connection member 222. The second elastic member 231 applies a second elastic force to the second fixing member 221 through the second connection member 222 and the second rods 223. The second elastic member 231 may be compressed in the vertical direction and restored to its original position. When the second fixing member 221 presses the lower surface of the outer peripheral portion of the skin S, the second elastic force of the second elastic member 231 allows the lower surface of the outer peripheral portion of the skin S to be elastically pressed.

A plurality of second elastic members 231 are provided. The plurality of second elastic members 231 may be uniformly arranged with respect to the second connection member 222. The second elastic members 231 are connected to each other by the second support member 232. The second connection member 222 is supported by the base 50 and fixed in position. Therefore, the second elastic members 231 may substantially simultaneously provide the second elastic force to the second fixing member 221 through the second connection member 222. For reference, the base 50 may support the second molding part 21 in a stationary state through a base support member (not illustrated).

The second elastic members 231 may have a smaller elastic modulus than the first elastic members 131. That is, the second elastic members 231 may have a greater strain than the first elastic members 131 under the same force application conditions. This means that the first elastic members 131 may have a greater strength than the second elastic members 231.

Thus, when the skin S is pressed and the core C and the skin S are pressed together, the first elastic members 131 may properly apply an elastic force to the first fixing member 121. In addition, when the skin S is pressed and the core C and the skin S are pressed together, the second elastic members 231 may effectively absorb an impact caused by a force acting on the second mold unit 20 from the first mold unit 10.

Figure 4:
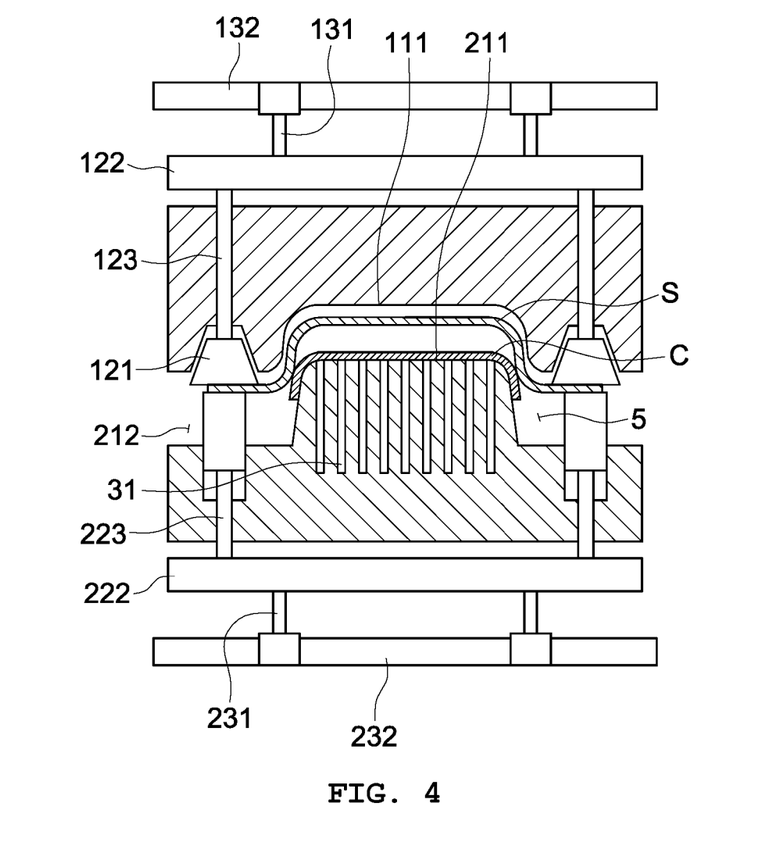

According to such a configuration, the apparatus according to the embodiment of the present disclosure may stably press and clamp the outer peripheral portion of the skin S by the first fixing member 121 and the second fixing member 221 (see FIG. 4).

In particular, the skin S may be positioned between the first mold unit 10 and the second mold unit 20 by the first fixing member 121 and the second fixing member 221 without being attached to the first molding surface 111 or the second molding surface 211. This thus eliminates the need for an operation of tilting the first mold unit 10 or the second mold unit 20 at a predetermined angle to attach the skin S.

As described above, according to the apparatus according to the embodiment of the present disclosure, it is possible to press the core C and the skin S after placing the core C and the skin S between the first mold unit 10 and the second mold unit 20 without tilting the first mold unit 10 or the second mold unit 20 at a predetermined angle. As a result, it is possible to simplify a manufacturing process of the interior material for the vehicle, and shorten a manufacturing time for the interior material for the vehicle.

The guide hole 213 of the second molding part 21 receives a lower portion of the closed ring-shaped second fixing member 221 and guides vertical movement of the second fixing member 221 while in close contact with the lower portion of the second fixing member 221. When the skin S is clamped by the first fixing member 121 and the second fixing member 221, as illustrated in FIG. 4, the skin S, the second molding surface 211, the second clamping region 212, and the second fixing member 221 form a blocking space 5 isolated from the outside and located between the first mold unit 10 and the second mold unit 20. Since the blocking space 5 is a space whose upper side is defined by the skin S, whose lower side is defined by the second molding surface 211 and the second clamping region 212, and defined by the closed ring-shaped second fixing member 221, the blocking space 5 includes a space between the core C and the skin S. Due to the fact that the first fixing member 121 and the second fixing member 221 have a closed ring shape, the first fixing member 121 and the second fixing member 221 are brought into close contact with the outer peripheral portion of the skin S by a pressing operation, the plurality of units of the second fixing member 221 are in close contact with each other, and the lower portion of the second fixing member 221 is in close contact with the guide hole 213 of the second molding part 21, the blocking space 5 may actively suppress inflow or outflow of gas such as air into or out of the blocking space 5. In order to more actively suppress gas flowing into the blocking space 5 from the outside or flowing outward from the blocking space 5 to the outside, a sealing member may be applied between the plurality of units of the second fixing member 221, or a sealing member may be applied between the lower portion of the second fixing member 221 and the guide hole 213 of the second molding part 21.

The air control unit 30 includes an air passage 31, an air supply part 32, and an air discharge part 33. The air control unit 30 may inject air into the space between the core C and the skin S or suck air from the space between the core C and the skin S. Since the space between the core C and the skin S is included in the blocking space 5, the amount of air between the core C and the skin S may be efficiently controlled by the air control unit 30.

When the first mold unit 10 is lowered for the pressing operation and brought closer to the second mold unit 20, the air control unit 30 injects air into a space between the core C and the skin S to form an air layer between the core C and the skin S, thereby preventing wrinkles from occurring in the skin S.

As the first mold unit 10 is brought closer to the second mold unit 20, the air layer formed between the core C and the skin S is compressed between the core C and the skin S, and the compressed air layer presses the skin S and the core C toward the first mold unit 10 and the second mold unit 20, respectively. As such, since the skin S is pressed toward the first mold unit 10 by the compressed air layer, the skin S is prevented from being wrinkled.

As described above, the first fixing member 121 and the second fixing member 221 may serve to clamp the skin S and also to provide the blocking space 5 between the first mold unit 10 and the second mold unit 20.

Meanwhile, the air control unit 30 may suck air from the space between the core C and the skin S and discharge the air to the outside so that the core C and the skin S are pressed together to be in close contact with each other. Therefore, a low pressure or vacuum atmosphere may be created between the core C and the skin S. Thereby, the core C and the skin S may make firm and close contact with each other, and the central portion of the skin S may be accurately and easily adhered to the core C.

The second molding part 21 is provided with a plurality of air inlets in the second molding surface 211. A plurality of air passages 31 are provided. The air passages 31 are famed inside the second molding part 21 and are connected to the air inlets. The air passages 31 are connected to the air supply part 32 and the air discharge part 33. Since the core C used to manufacture the interior material for the vehicle according to the embodiment of the present disclosure has a porous structure, passages of the core C are formed, wherein the passages of the core C allow air (or gas) to pass through the core C. Therefore, in a state in which the core C is mounted on the second molding surface 211, air supplied to the blocking space 5 through the air passages 31 may pass through the passages of the core C and be injected into the space between the core C and the skin S, and a suction force acting on the air passages 31 may be transmitted through the passages of the core C to the space between the core C and the skin S.

The air supply part 32 may include an air pump or an air compressor. The air supply part 32 may supply air to the air passages 31 to inject air between the core C and the skin S through the passages of the core C. While the air supply part 32 is in operation, the air discharge part 33 may be stopped, and a flow path connecting the air passages 31 and the air discharge part 33 may be closed by a valve.

The air discharge part 33 may include a vacuum pump. The air discharge part 33 generates a suction force. The suction force generated by the air discharge part 33 acts on the air passages 31 and also acts on the space between the core C and the skin S through the passages of the core C. Thereby, the air discharge part 33 may suck air between the core C and the skin S into the air passages 31 through the passages of the core C and discharge the air to the outside. While the air discharge part 33 is in operation, the air supply part 32 may be stopped, and a flow path connecting the air passages 31 and the air supply part 32 may be closed by a valve.

According to the embodiment of the present disclosure, when the core C and the skin S are pressed together, air is injected into the space between the core C and the skin S and is discharged from the space between the core C and the skin S. Thus, it is possible to prevent wrinkles from occurring in the skin S, and to facilitate pressing of the core C and the skin S. As a result, it is possible to improve surface quality of the skin S, and to lower manufacturing cost by reducing defect rate.

Hereinafter, the operation of the apparatus according to the embodiment of the present disclosure will be described with reference to FIGS. 2 to 7.

Figure 2:
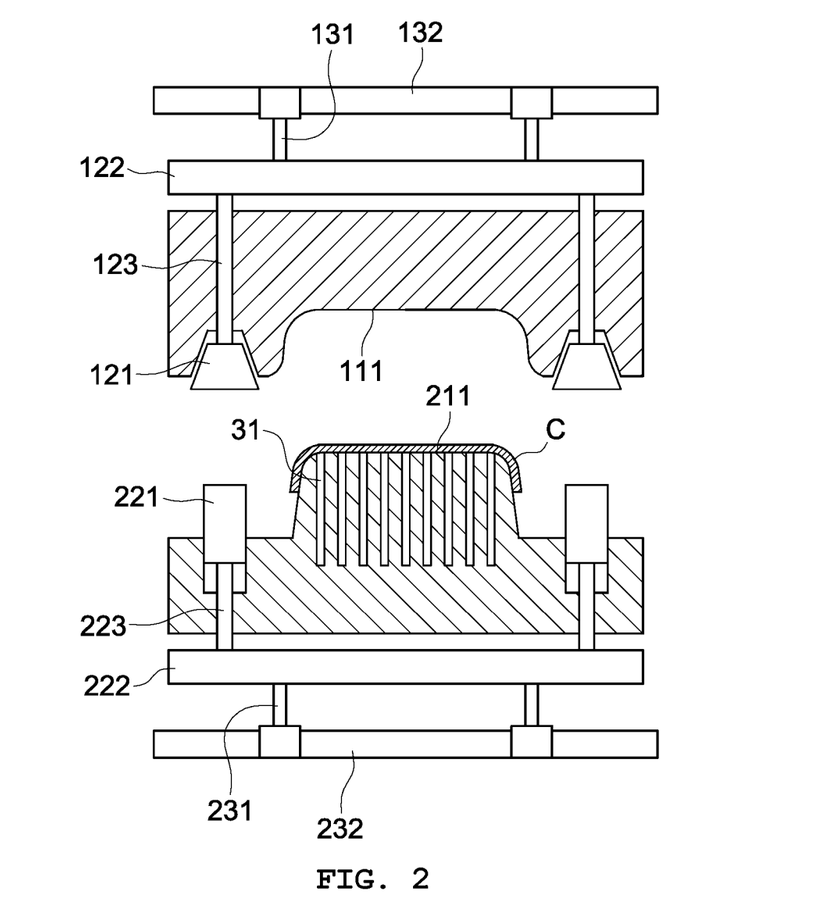
FIGS. 2 to 7 are views sequentially illustrating a process of operating the apparatus for manufacturing the interior material for the vehicle according to the embodiment of the present disclosure.

First, as illustrated in FIG. 2, the core C having a porous structure is mounted on the second molding surface 211. In this process, the air discharge part 33 may be selectively operated. When the air discharge part 33 is operated, the core C may be adsorbed onto the second molding surface 211.

Figure 3:
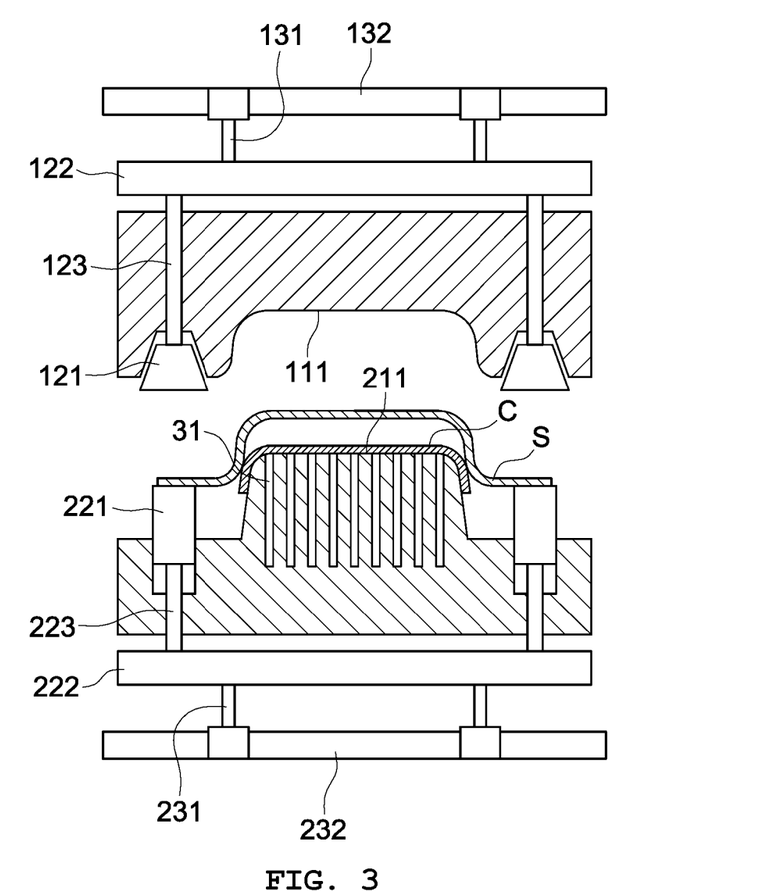

Then, referring to FIG. 3, the skin S is mounted on the second fixing member 221. Thereby, the second fixing member 221 supports the outer peripheral portion of the skin S.

Then, referring to FIG. 4, the first mold unit 10 is lowered by the lifting unit 40 to allow the first fixing member 121 to press the outer peripheral portion of the skin S from above. After that, the first fixing member 121 and the second fixing member 221 together press the outer peripheral portion of the skin S placed between the first mold unit 10 and the second mold unit 20 to clamp the skin S. At this time, the blocking space 5 including the space between the core C and the skin S is formed between the first mold unit 10 and the second mold unit 20. In this process, the air supply part 32 is operated to inject air into the space between the core C and the skin S.

As such, since the first fixing member 121 and the second fixing member 221 clamp the skin S between the first mold unit 10 and the second mold unit 20, an operation of attaching the skin S to the first molding surface 111 is not required. This thus eliminates the need for a process of tilting the first mold unit 10 to a predetermined angle. As a result, it is possible to simplify a manufacturing process of the interior material for the vehicle, and shorten a manufacturing time for the interior material for the vehicle.

In addition, since the blocking space 5 that blocks the space between the core C and the skin S from the outside is formed when the skin S is clamped, it is possible for air supplied from the air supply part 32 to be sealed in the space between the core C and the skin S without an additional sealing structure.

Figure 5:
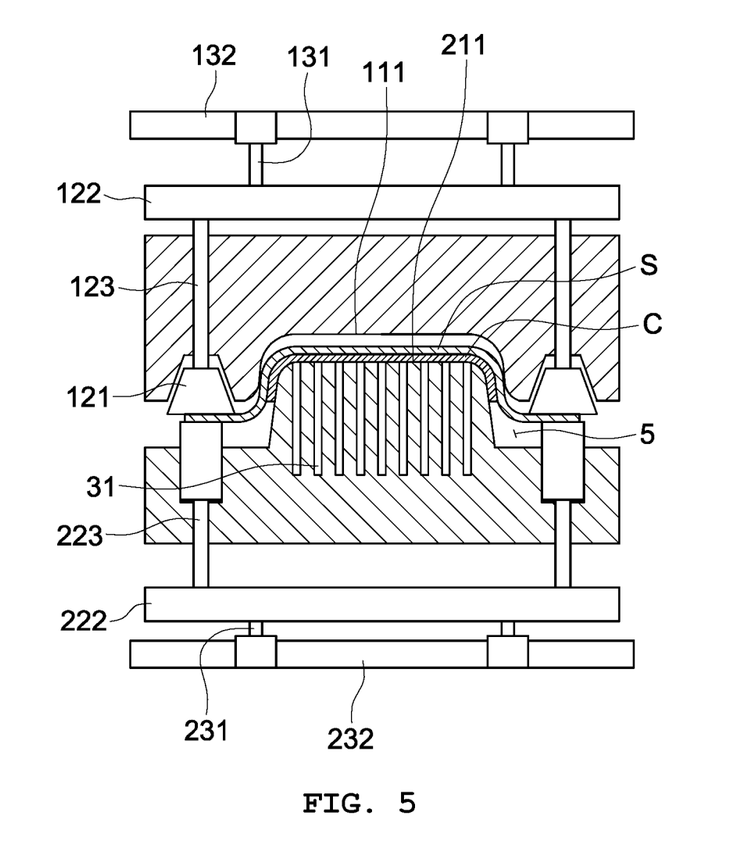

Then, referring to FIG. 5, as the first mold unit 10 is further lowered, the central portion of the skin S is brought into contact with the core C (pre-pressing). In this process, air is continuously injected into between the core C and the skin S to prevent wrinkles from occurring in the skin S. The second elastic members 231 may be more compressed than the first elastic members 131.

Figure 6:
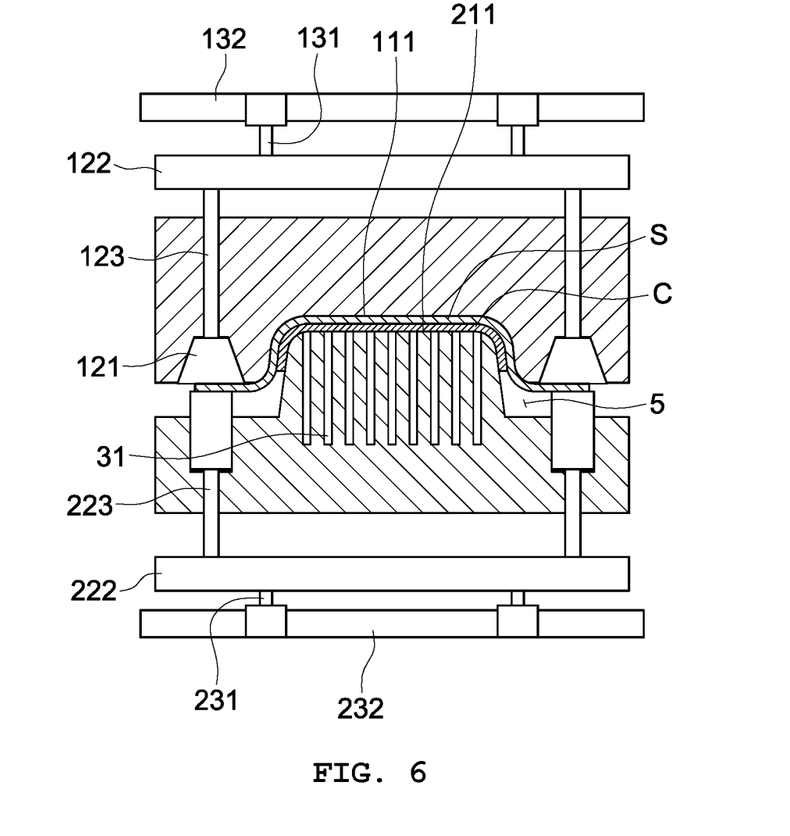

Then, referring to FIG. 6, as the first mold unit 10 is further lowered, the first molding surface 111 is brought into contact with the skin S to press the skin S. Thereby, the core C and the skin S are pressed together by the first molding surface 111 and the second molding surface 211. In this process, the air discharge part 33 is operated to discharge air from the space between the core C and the skin S. Thereby, a low pressure or vacuum atmosphere is created in the space between the core C and the skin S, so that the core C and the skin S are adhered.

Figure 7:
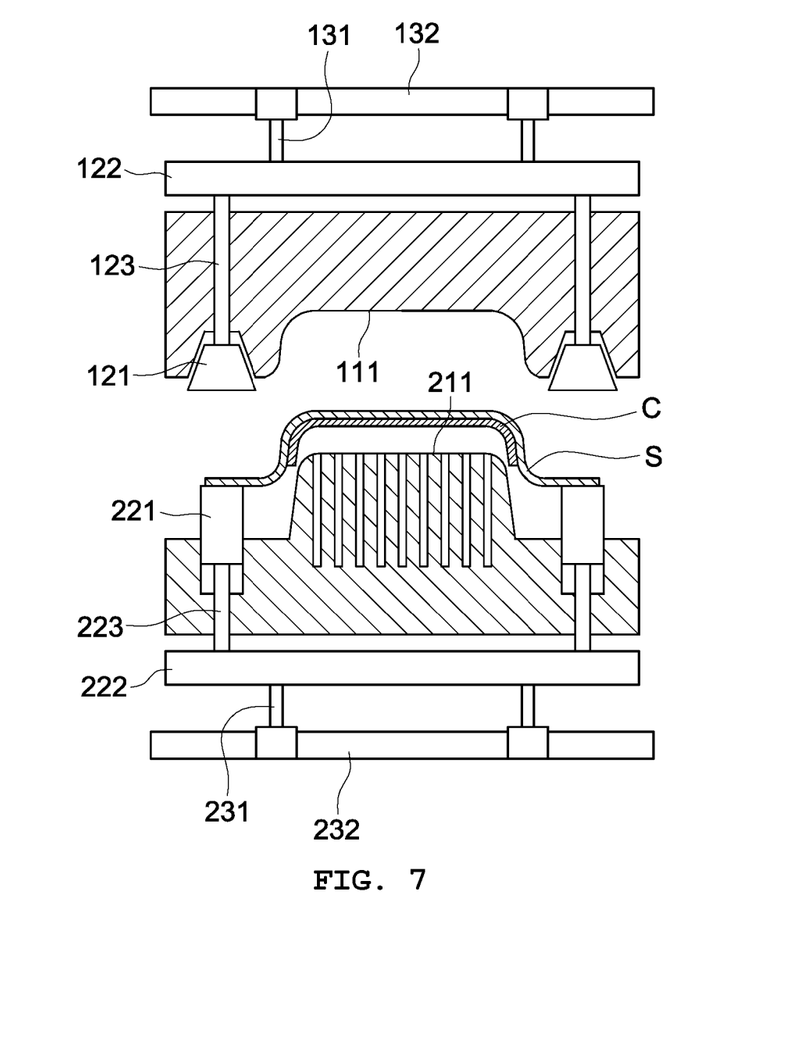

Then, referring to FIG. 7, the lowered first mold unit 10 is raised, and the pressed core and skin S are taken out. In this process, the lowered second fixing member 221 is returned to its original position by a restoring force of the second elastic members 231. Thereby, the pressed core C and skin S may be easily taken out from the second molding surface 211.

Hereinafter, a method using the apparatus according to an embodiment of the present disclosure will be described with reference to FIG. 8.

Figure 8:
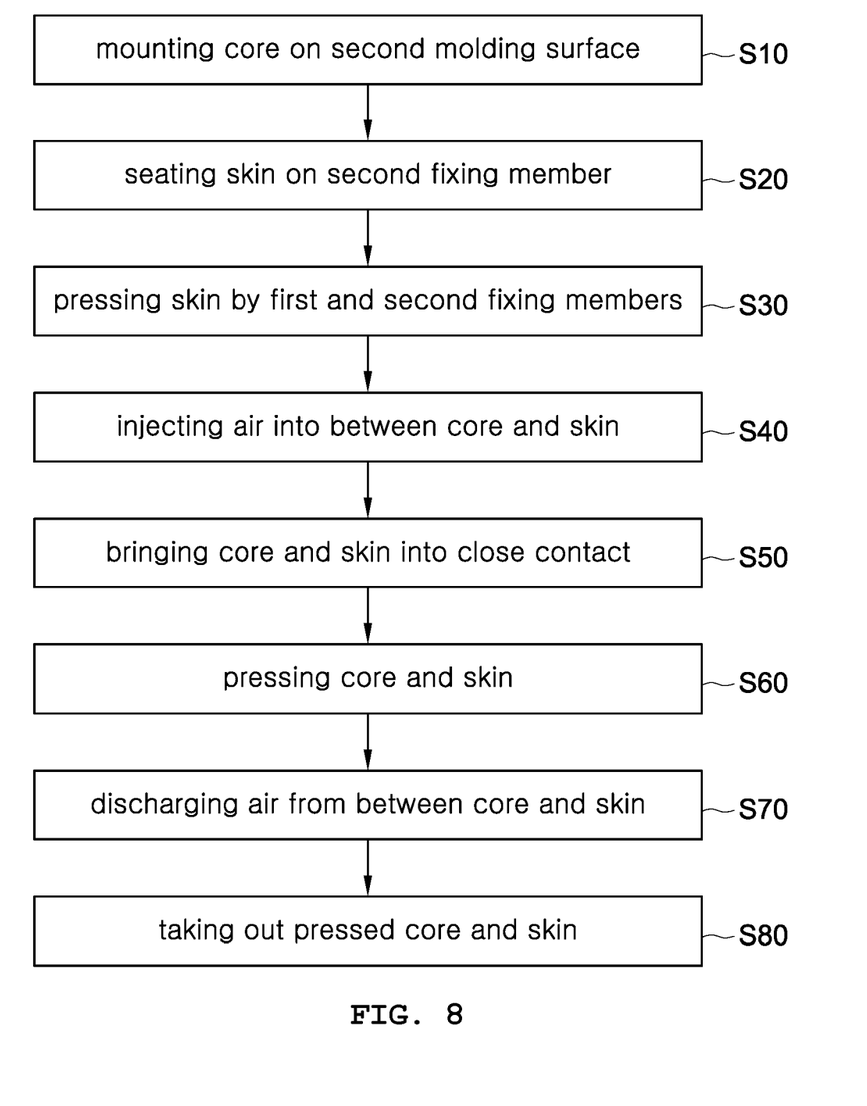
FIG. 8 is a flowchart illustrating a method of manufacturing an interior material for a vehicle according to an embodiment of the present disclosure.

Referring to FIG. 8, the method according to the embodiment of the present disclosure may include: mounting a core C having a porous structure on a second molding surface 211 (S10); seating a skin S on a second fixing member 221 (S20); clamping the skin S by a first fixing member 121 and the second fixing member 221 by pressing the skin S by the first fixing member 121 (S30); injecting air into a space between the core C and the skin S (S40); bringing the core C and the skin S into contact with each other while maintaining a state that a first molding surface 111 is not in contact with the skin S (S50); pressing the core C and the skin S by the first molding surface 111 and the second molding surface 211 by further lowering the first molding surface 111 (S60); discharging air from between the core C and the skin S (S70); and taking out the pressed core C and skin S (S80).

In step S10, an air discharge unit 33 may be selectively operated to adsorb the core C onto the second molding surface 211 by a suction force.

In step S20, the second fixing member 221 may support an outer peripheral portion of the skin S from below. The state in which the skin S is seated may be stably maintained by using the weight of the skin S or by adsorption, adhesion, or pressure-sensitive adhesion of the skin S.

In step S30, a first mold unit 10 may be lowered. Thereby, as the first fixing member 121 is lowered, the first fixing member 121 and the second fixing member 221 press the outer peripheral portion of the skin S together, thereby clamping the skin S between the first mold unit 10 and a second mold unit 20. When the skin S is clamped, a blocking space 5 defined by the skin S, the second molding surface 211, a second clamping region 212, and the second fixing member 221 may be formed. The blocking space 5 includes a space between the core C and the skin S.

In step S40, an air supply part 32 may be operated to supply air to a plurality of air passages 31. The air may be introduced through the air passages 31, and then injected into the space between the core C and the skin S through passages of the core C. The air injected into the space between the core C and the skin S may prevent wrinkles from occurring in the skin S.

In step S50, the first mold unit 10 may be further lowered. Thereby, the skin S may be brought into close contact with the core C (pre-pressing). In this process, the first molding surface 111 is not in contact with the skin S while the skin S is in contact with the core C, which provides a degree of freedom of movement of the skin S. This prevents wrinkles from occurring in the skin S.

In step S60, the first mold unit 10 may be further lowered. In this process, a plurality of second elastic members 231 may be more compressed than a plurality of first elastic members 131. Also, in this process, air is continuously injected into the space between the core C and the skin S to prevent wrinkles from occurring in the skin S. In addition, the core C and the skin S may be pressed together to form a shape conforming to the first molding surface 111 and the second molding surface 211.

In step S70, a low pressure or vacuum atmosphere may be created in the space between the core C and the skin S, so that the core C and the skin S may be adhered.

In step S80, the second fixing member 221 may be returned to its original position by a restoring force of the second elastic members 231. Thereby, the pressed core C and skin S may be separated from the second molding surface 211. As a result, the pressed core C and skin S may be easily taken out.

Although preferred embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. An apparatus for manufacturing an interior material for a vehicle, the apparatus comprising:
    a first mold unit having a first molding surface; and
    a second mold unit located below the first mold unit, having a second molding surface corresponding to the first molding surface, and configured to mount a core on the second molding surface, the core being in a porous structure having air channels through which air passes; and
    an air controller configured to inject and discharge the air;
    wherein the first molding surface and the second molding surface press the mounted core and a central portion of a skin placed above the mounted core when brought closer to each other,
    the first mold unit comprises a first fixing part,
    the second mold unit comprises a second fixing part, and
    the first fixing part and the second fixing part clamp the skin by pressing an outer peripheral portion of the skin placed between the first mold unit and the second mold unit,
    wherein the air controller is configured to inject the air in an upward direction into a space between the core and the skin through the air channels of the core to lift a portion of the skin over the core and keep the portion of the skin apart from the core, and then discharge the air in a downward direction from the space through the same air channels of the core.

2. The apparatus of claim 1, further comprising:
    a first support part comprising a first elastic member configured to apply a first elastic force to the first fixing part; and
    a second support part comprising a second elastic member configured to apply a second elastic force to the second fixing part.

3. The apparatus of claim 2, wherein the second elastic member has a smaller elastic modulus than the first elastic member.

4. The apparatus of claim 3, wherein
when the first fixing part and pressed the second fixing part clamp the skin, the second elastic member located below the skin is deformed by a greater degree than the first elastic member located above the skin, such that the core and the skin become in contact with each other before the skin becomes in contact with and is pressed by the first mold surface.

5. The apparatus of claim 2, wherein the first elastic member comprises a plurality of first elastic members, and
the plurality of first elastic members are connected to each other through a first support member to simultaneously apply the first elastic force to the first fixing part.

6. The apparatus of claim 2, wherein the second elastic member comprises a plurality of second elastic members, and
the plurality of second elastic members are connected to each other through a second support member to simultaneously apply the second elastic force to the second fixing part.

7. The apparatus of claim 1, wherein the first fixing part comprises a first fixing member disposed to face the second mold unit and configured to support the skin by contacting an upper surface of the outer peripheral portion of the skin, and
the second fixing part comprises a second fixing member disposed to face the first fixing member and configured to support a lower surface of the outer peripheral portion of the skin.

8. The apparatus of claim 7, wherein the first fixing member comprises a plurality of first fixing members, and
the plurality of first fixing members are connected to a first connection member through a plurality of first rods to simultaneously clamp the skin.

9. The apparatus of claim 7, wherein the second fixing member comprises a plurality of second fixing members, and
the plurality of second fixing members are connected to a second connection member through a plurality of second rods to simultaneously clamp the skin.

10. The apparatus of claim 1, wherein
the air controller comprises an air supply part and an air discharge part,
the second mold unit is provided with a plurality of air inlets in the second molding surface,
a plurality of air passages are formed inside the second mold unit and communicating with the plurality of air inlets, the plurality of air passages being connected to the air supply part and the air discharge part,
wherein the air is provided by the air supply part in the upward direction through the air passages inside the second mold unit, the plurality of air inlets in the second mold surface and the air channels of the core, and then the air is discharged by the air discharge part in the downward direction through the air channels of the core, the plurality of air inlets in the second mold surface, and the air passages inside the second mold unit.

11. The apparatus of claim 10, wherein
as the first mold unit is lowered and the first fixing part is brought to contact the second fixing part, the air controller is configured to inject the air into the space between the core and the skin to form an air layer between the core and the skin, thereby preventing wrinkles from occurring in the skin.

12. A method of manufacturing an interior material for a vehicle by using an apparatus of claim 1, the method comprising the steps of:
(a) mounting the core on the second molding surface;
(b) seating the skin on a second fixing member;
(c) clamping the seated skin by a first fixing member and the second fixing member by moving the first fixing member toward the second fixing member; and
(d) pressing the mounted core and the clamped skin by the first molding surface and the second molding surface by bringing the first molding surface and the second molding surface closer to each other;
between step (c) and step (d), injecting the air in the upward direction into the space between the core and the skin through the air channels of the core to lift a portion of the skin over the core and keep the portion of the skin apart from the core; and
after step (d), discharging the air in the downward direction from the space through the air channels of the core.

13. The method of claim 12, further comprising, between step (c) and step (d), the following step: bringing the core and the skin into close contact with each other while the first molding surface is not in contact with the skin.

* * * * *